(12) United States Patent
Wilkison

(10) Patent No.: US 6,211,807 B1
(45) Date of Patent: Apr. 3, 2001

(54) SYSTEM USING SPREAD SPECTRUM MODULATION FOR LOCATING UNDERGROUND OBJECTS

(75) Inventor: Dennis Wilkison, San Jose, CA (US)

(73) Assignee: Geometrics, San Jose, CA (US)

( * ) Notice: Subject to any disclaimer, the term of this patent is extended or adjusted under 35 U.S.C. 154(b) by 0 days.

(21) Appl. No.: 09/318,558

(22) Filed: May 26, 1999

(51) Int. Cl.[7] ............................... G01S 13/88; G01V 3/12
(52) U.S. Cl. ............................... 342/22; 342/27; 342/118; 342/134; 342/135; 342/175; 342/195; 324/326; 324/332; 324/344; 375/130; 375/140; 375/146; 375/147
(58) Field of Search .............................. 342/22, 27, 175, 342/192, 193–196, 59, 130–153, 118, 126–129, 176–186; 375/200–204, 206–210; 324/326–329, 332–344, 347, 354, 355–375

(56) References Cited

U.S. PATENT DOCUMENTS

| | | |
|---|---|---|
| 4,181,014 | 1/1980 | Zuvela et al. . |
| 4,420,752 | 12/1983 | Davis et al. . |
| 4,542,344 | 9/1985 | Darilek et al. . |
| 4,642,556 | 2/1987 | Pecukonis . |
| 4,935,736 | 6/1990 | Meierdierck . |
| 4,937,580 * | 6/1990 | Wills ................................. 342/22 |
| 4,942,365 | 7/1990 | Satterwhite . |
| 5,065,098 | 11/1991 | Salsman et al. . |
| 5,093,622 | 3/1992 | Balkman . |
| 5,151,695 | 9/1992 | Rollwitz et al. . |
| 5,264,795 | 11/1993 | Rider . |
| 5,361,029 | 11/1994 | Rider et al. . |
| 5,365,163 | 11/1994 | Satterwhite et al. . |
| 5,471,143 | 11/1995 | Doany . |
| 5,585,727 | 12/1996 | Fanini et al. . |
| 5,614,891 | 3/1997 | Zeinstra et al. . |
| 5,640,092 | 6/1997 | Motazed et al. . |
| 5,748,891 * | 5/1998 | Fleming et al. ................. 375/200 |
| 6,002,708 * | 12/1999 | Fleming et al. ................. 375/200 |
| 6,031,485 * | 2/2000 | Cellai et al. ................. 342/192 X |

OTHER PUBLICATIONS

Geometrics OhmMapper—Resistivity Mapping™—first distribution in Feb. 1999.

Timofeev, V.M. (Vsegingeo, Moscow, Russia), "Electric and Electromagnetic Profiling With Ground Capacitive Line–Antennas,"—paper presented at a seminar in USSR or in Russia, in or about 1995.

* cited by examiner

Primary Examiner—Bernarr E. Gregory
(74) Attorney, Agent, or Firm—Townsend and Townsend and Crew LLP; Henry K. Woodward

(57) ABSTRACT

The location of underground objects such as pipes and conduits are located by detecting electrical signals emitted by the underground objects where the radiated signals include spread spectrum modulated RF signals. The system can operate in a passive or active mode, and in the active mode pseudo-noise (PN) generators can be employed or frequency-hopping can be employed. The use of spread spectrum minimizes or eliminates conflicting signals radiated from a plurality of underground objects and can improve signal to noise ratio of the detected signals.

16 Claims, 7 Drawing Sheets

Simplified Frequency Hopping Spread Spectrum Xmitr.

SYSTEM USING SPREAD SPECTRUM MODULATION FOR LOCATING UNDERGROUND OBJECTS

BACKGROUND OF THE INVENTION

This invention relates generally to locating underground objects, and more particularly the invention relates to locating an underground object in the presence of other underground objects.

Buried pipes and conduits are used by a large number of utility companies including telephone, water, gas, CATV, and electric power. Frequently it becomes necessary to excavate in an area where one or more of these conduits have been placed. It also becomes necessary to repair broken or leaky conduits. Conversely, it is important to know the location of each of the conduits or pipes before any digging or excavation begins.

In order to facilitate the replacement and repair of buried utility systems it is important to have a simple and quick method of locating the true position of the buried conduits. Most buried utility systems are constructed of materials which produce a magnetic field when electric current is passed through them. In cases where the pipe or conduit is made of a non-conductive or non-magnetic material, there is typically a wire or metal line placed in direct proximity therewith. AC currents can be induced in the conductive wire or pipe thus producing an AC magnetic field.

There are a number of existing devices which are used to locate buried or otherwise concealed electrically conductive objects. The devices use an alternating current which is impressed on the concealed conductive object, such as a pipe or cable, by direct connection or by inductive coupling. The object can be located in a horizontal underground plane or in a lateral plane by use of a suitable horizontal axis pickup coil and amplifier with an appropriate indicating device such as a meter or audio transducer. When the receiver pickup coil is brought closer to the object being investigated, the AC signal level increases and the position nearest the object produces the strongest signal.

Several instruments have been developed to provide this function. For example, U.S. Pat. No. 4,387,340 issued to E. Peterman discloses a receiver having four sensors mounted in a fixed relationship. Two of the sensors (antenna coils) are used for left-right determination of the position of the buried conductor. In operation, the axes of both coils are horizontally disposed and the coils are horizontally spaced. The outputs are subtractively combined to produce a signal which is related to the difference between the magnetic flux in each coil. Thus when the device is centered over the conductor, the field strengths through the coils cancel each other out, which is reflected in an appropriate display device. When the difference is non-zero, the phase of one horizontal coil is compared to the phase of the other to determine left-right position.

A device operating on a slightly different principle is described in U.S. Pat. No. 4,427,942 issued to L. Sole. That device employs two coils whose axes are horizontally disposed, the coils being separated vertically. The coil signals are rectified and the average DC voltages compared. When the apparatus is directly over the conductor, the two signals are essentially equal (non zero), and an indicator alerts the user to this fact. This device does not, however, provide left-right guidance.

Another invention operates on a phase comparison principle similar to Peterman U.S. Pat. No. 4,639,674 depicts an apparatus having three coils, all vertically disposed, lying in a triangular formation, the plane formed thereby being vertical also. A flip-flop serves as a phase detector between the two signals from the lower coils. The third cell acts to eliminate of ambient magnetic fields.

Three other patents of interest employ phase comparison to locate the conductor. U.S. Pat. Nos. 4,134,061 issued to H. Gudgel; 4,438,389 issued to A. DeSa; and 4,390,836 issued to Bruce et al. Each includes additional coils for locating faults in the conductor in addition to tracing the conductor path. The '836 patent employs two horizontally disposed coils for tracing the conductor path.

The use of orthogonally disposed coils is also illustrated in U.S. Pat. No. 4,220,913 issued to Howell et al. Four coils are shown in a rectangular arrangement, however, only the two vertically disposed coils are initially used to determine whether the unit is directly above the buried conductor. Left-right determination is then made by comparing the phase of the signal from one of the vertical coils to the phase of the signal from one of the horizontal coils. In other words, it is not necessary to use all four coils for left-right determination (the "extra" coil is used for depth determination).

Another orthogonal configuration of coils is disclosed in U.S. Pat. No. 4,542,344 issued to Darilek et al which uses two sensors horizontally separated at a distance R, which are held a fixed distance from the ground by a rod. Each sensor is comprised of two coils, one vertically disposed and one horizontally disposed, resulting in four leads. The leads are multiplexed and combined in to a single output fed in to an Automatic Gain Control (AGC). The AGC averages the amplitude of each signal against the prior four signal amplitudes, this produces a weighted value for each coil. These value are used to calculate the left-right offset.

A problem with these systems arises when several pipes are located in the same area and the location of all pipes is desired. Signals transmitted by several pipes can interfere and complicate the detection process. U.S. Pat. No. 5,264,795 to Rider includes an encoded digital or analog code in the carrier in order to facilitate identification of a transmitter and conduit. The transmitter uses a discrete frequency and includes a transmitter identification code sent as a modulated signal. Other information can be modulated on the carrier including voice and tones to reveal battery conditions.

The present invention provides a method of locating one or more underground objects utilizing concurrent radio wave transmission by employing spread spectrum modulation techniques.

SUMMARY OF THE INVENTION

In accordance with the present invention an underground electrically conductive object is located through use of spread spectrum modulation of an electrical signal impressed on the object. The invention is especially advantageous in locating an underground object in the presence of other underground objects since spread spectrum allows transmitter identification and avoidance of signals from other transmitters. Further, spread spectrum enhances signal to noise ratio. The spreading code is readily programmable for differentiating other transmitted signals.

The system can be operated in either a passive mode or an active mode. In the passive mode a receiver operates in several discrete frequency bands which are detected along with harmonics of the fundamental frequency signals. In an active mode the transmitted signals are modulated by pseudo-noise (PN) signals which are selected for their correlation properties. A direct sequence (DS) method is employed in which a carrier signal is mixed with a pseudo-random pulse train from a spreading code generator in a doubly balanced mixed for RF carrier suppression.

In another preferred embodiment, frequency-hopping is employed for the spread spectrum modulation. With frequency-hopping a plurality of individually modulated carriers share a common allocated spectrum. Either phase-lock loops (PPL) or a direct digital synthesizer (DDS) can be employed for the frequency hop modulation.

The invention and objects and features thereof will be more readily apparent from the following detailed description and appended claims when taken with the drawings.

DETAILED DESCRIPTION OF ILLUSTRATIVE EMBODIMENTS

Figure 1:
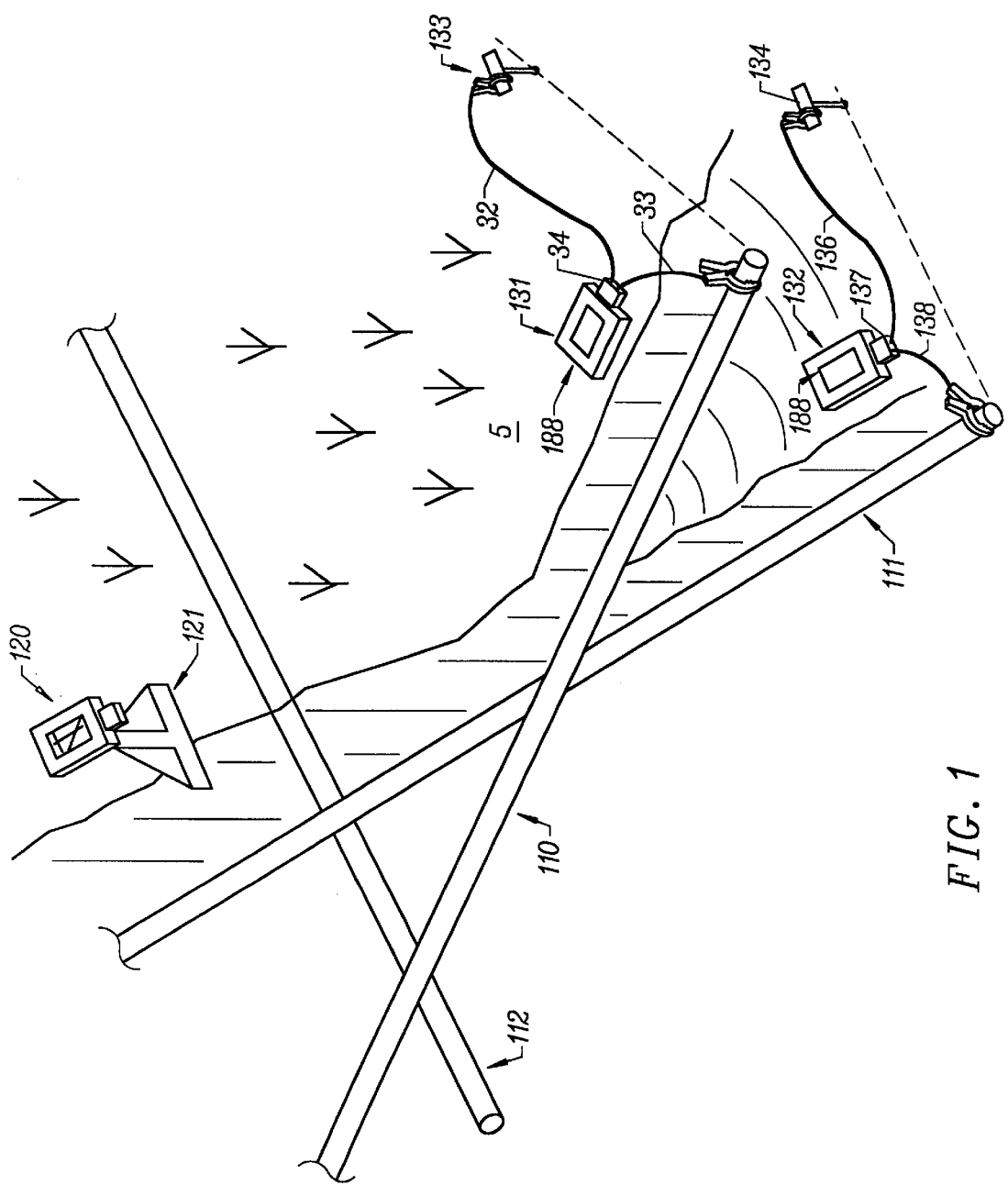
FIG. 1 is a schematic representation of apparatus in accordance with the invention for locating an underground pipe in the presence of another pipe.

Referring now to the drawings, FIG. 1 is an overall representation of the invention in locating conductive pipes 110 and 111 in the presence of an additional pipe 112 all underground. A first spread spectrum transmitter 131 has a code thumbwheel 188 set to a first code (22) and a second spread spectrum transmitter 132 has a code thumbwheel 188 set to a second code (21). Transmitter 131 is connected through lead 33 to pipe 110 and through lead 32 to a ground stake 133 typically arranged perpendicular to the connection of line 33. Similarly, transmitter 132 is connected through line 138 to pipe 111 and through line 136 to a ground stake 134. The connections to the pipes are preferably by a direct electrical connection or by an inductive clamp, and the connections to the ground stakes can be by alligator clip, for example.

A locator receiver 120 has a plurality of sensors or antenna array 121 positioned above ground to pickup spread spectrum signals from pipe 110 and pipe 111. The receiver has a corresponding thumbwheel code selector for selecting either the code from transmitter 131 or the code from transmitter 132 whereby signals from the chosen transmitter can be received and decoded without interference from the other transmitter.

Figure 2:
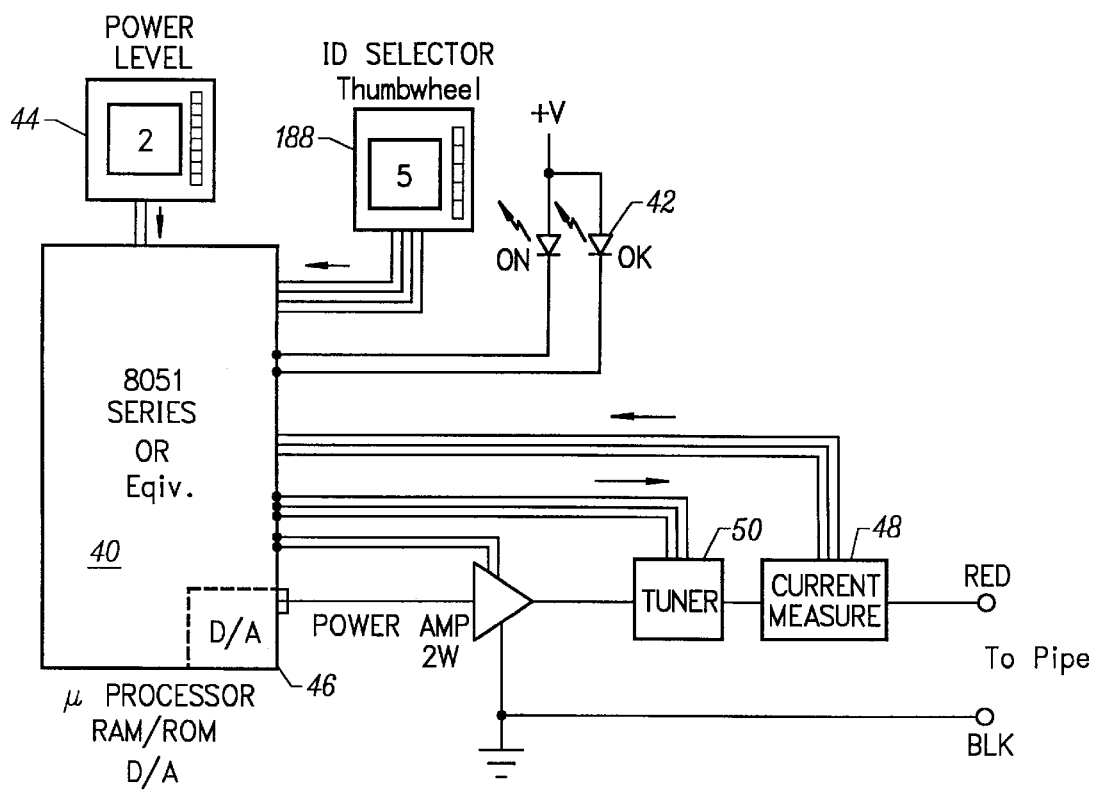
FIG. 2 is a functional block diagram of a transmitter in the system of FIG. 1 in accordance with one embodiment of the invention.

FIG. 2 is a functional block diagram of one of the transmitters and includes a microprocessor 40 including the code selector thumbwheel 188, a power source (+V) connected through LED diodes 42 (for displaying power) to processor 40, and a power level thumbwheel 44. As will be described further hereinbelow, microprocessor 40 transmits frequency-hopping direct sequence spread spectrum signals using a D/A converter 46 from an internal read only memory (ROM) code according to a sequence specified by the ID selector thumbwheel 188. The signal is monitored by the current monitoring circuit 48, and when the SWR is not a good match, the microprocessor adjusts tuner 50 to one of a plurality of positions to achieve a better standing wave ratio match. Output power can be adjusted to one of several levels by the power level thumbwheel 44.

Figure 3:
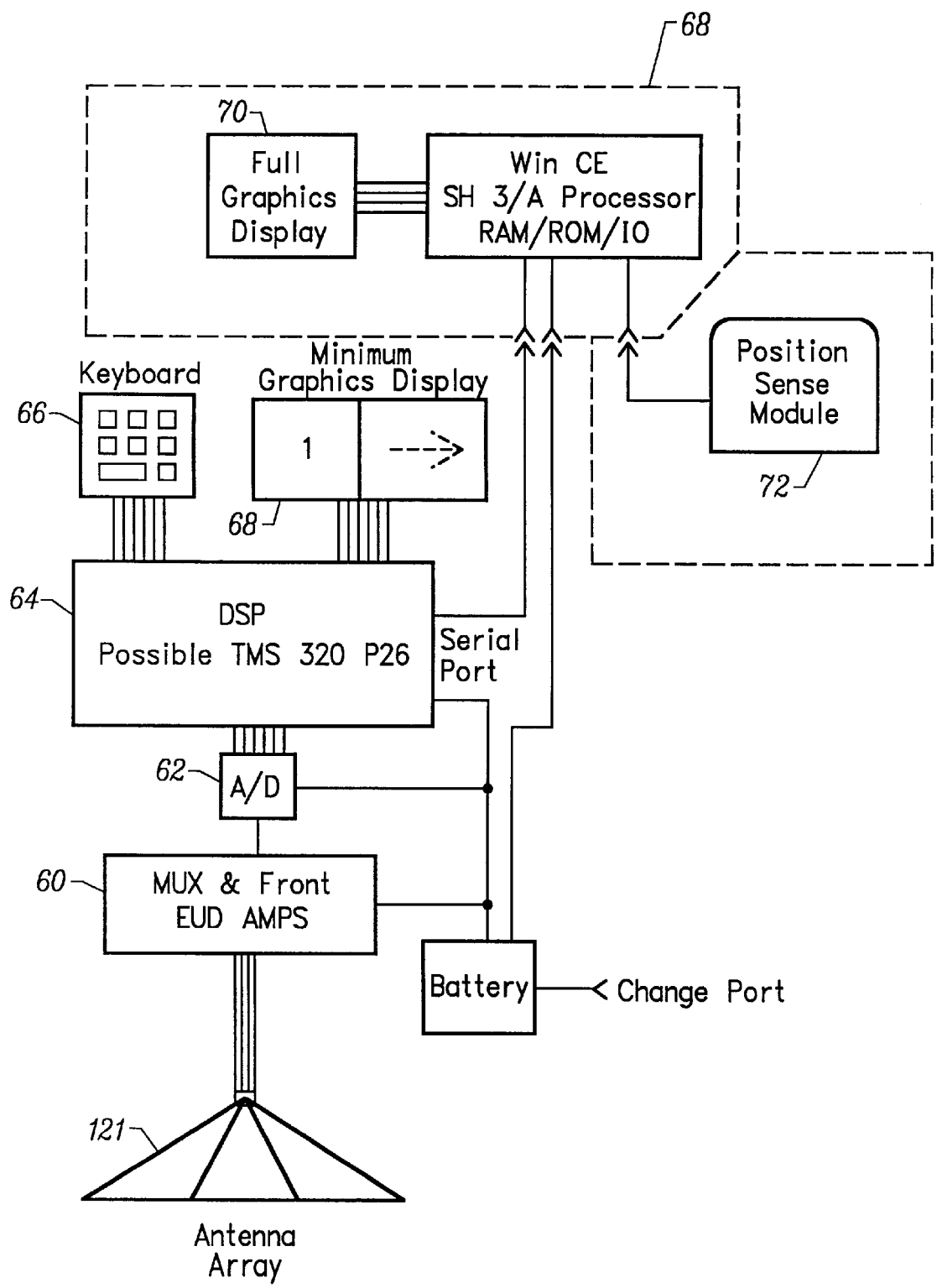
FIG. 3 is a schematic of a receiver and imager in the system of FIG. 1 in accordance with one embodiment of the invention.

FIG. 3 is a functional block diagram of receiver 120 and includes the antenna array 121 which is connected through a multiplexer and front end amplifiers 60 and analog to digital converter 62 to a digital signal processor 64. Processor 64 can be addressed manually by a keyboard 66 and includes a minimum graphics display 68 for displaying the selected spread spectrum code, for example. DSP 64 is also connected a mapper module 68 including a full graphics display 70 and a position sensor module 72.

Figure 4:
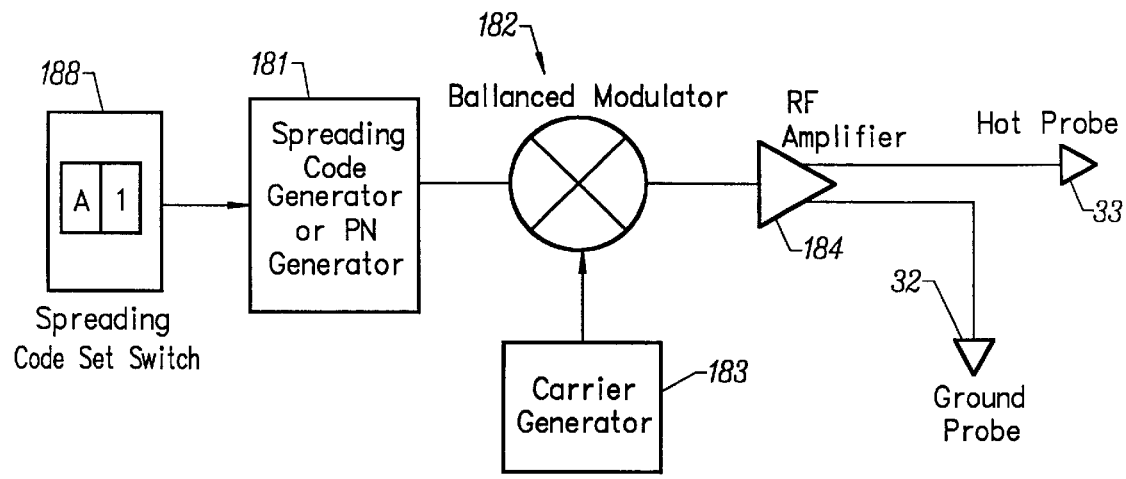
FIG. 4 is a block diagram of a transmitter using a pseudo-noise generator in accordance with one embodiment of the invention.

Operation of the transmitter will now be described with reference to FIGS. 4 and 5 and operation of the receiver will be described with references to FIGS. 6 and 7. In FIG. 4 the spreading code set switch 188 controls a spreading code generator or pseudo-noise generator 181 with the output of generator 181 modulating a signal from carrier generator 183 in a balanced modulator 182. The modulated carrier is then amplified at 184 and applied to a hot probe 33 coupled to an underground pipe. Another output of amplifier 184 is connected to the ground probe 32. Transmitter 131 spreads its signal over a wide bandwidth in accordance with the pre-arranged code. To generate the spreading sequence of code, use is made of the pseudo-noise (PN) generator 181 which is selected for correlation properties. Thus when two similar PN sequences are compared out of phase the correlation is nil (i.e., the output is zero). When they are exactly in phase a correlation produces a large peak that can be used for synchronization purposes. The carrier generator 183 sets the center frequency of operation. The carrier generator 183 and the spreading code information are presented to the balanced modulator 182, and the output of balanced modulator 182 is amplified at 184 and conveyed to the hot probe 33 with respect to ground probe 32. A direct sequence (DS) form of spread spectrum can be employed in which the carrier generator 183 output is mixed with a pseudo-random pulse train from spreading code generator 181 in a doubly balanced mixer 182. In this process, the RF carrier disappears and is replaced by a noise like wide band transmission which is amplified at 184 and conveyed to the hot probe 33.

Figure 5:
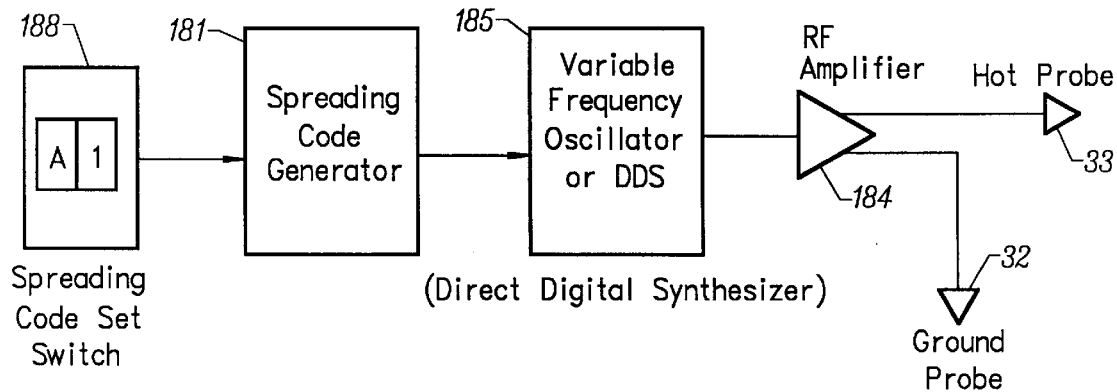
FIG. 5 is a functional block diagram of a transmitter using frequency-hopping spread spectrum in accordance with one embodiment of the invention.

FIG. 5 represents a simpler approach to spread spectrum using frequency-hopping. Again, the spreading code is set by switch 188 to control the spreading code generator 181 which then controls a variable frequency oscillator or direct digital synthesizer 185. The output is again applied through an RF amplifier 184 to a hot probe 33 and ground 32. The concept of frequency hopping spread spectrum includes many individually modulated carriers sharing a common allocated spectrum. Frequency-hopping implements a solution to the bandwidth space conflict by pro-actively changing the transmission frequency constantly. Each transmitter can communicate simultaneously by using its selected sequence of bandwidth. Frequency-hopping is preferred as interference rejection occurs because the signal hops near to an interferer only a small fraction of the time. Frequency-hopping also allows frequency programmability, dynamic range improvement, frequency avoidance, and automatic transmitter identification.

A preferred method for modulation is the direct digital synthesizer (DDS). The DDS replaces the previously used multiple phase lock loops (PPLs) required for fast frequency-hopping. Digital signal processor (DSP) technology is used in modems and cellular telephone technology to accomplish a spread spectrum, as is well known in the art. With a digital signal processor the signal is generated at base band frequencies and no frequency multiplication is required. A frequency-hopping modulated carrier is simpler to receive and achieve synchronization than direct sequence spread spectrum.

Figure 6:
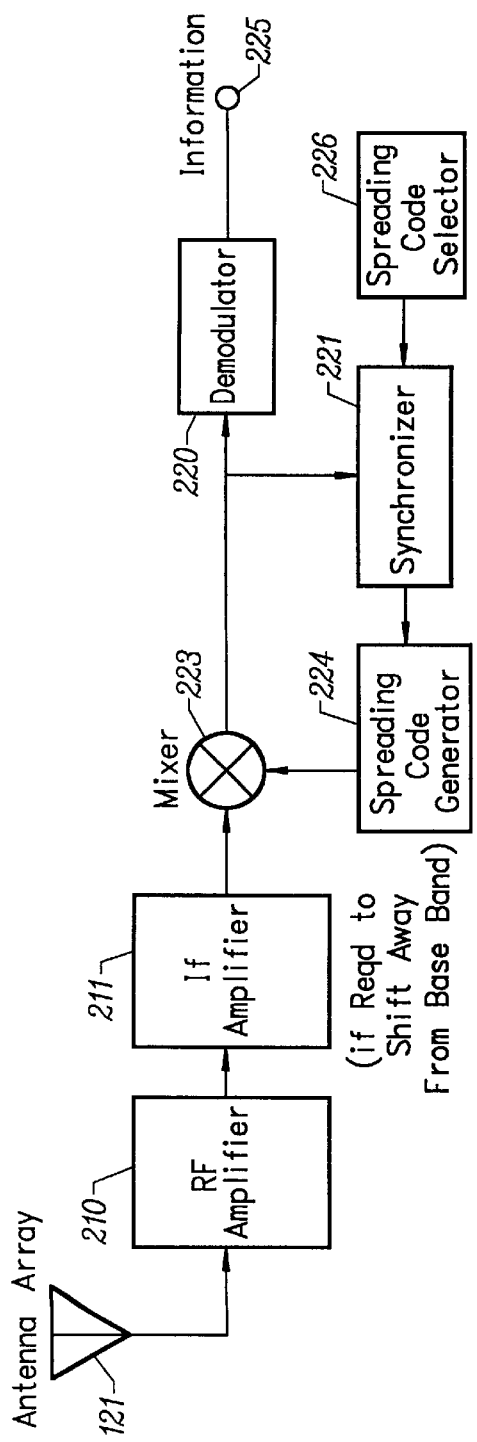
FIG. 6 is a functional block diagram of a direct sequence spread spectrum receiver as used in one embodiment of the invention.
Figure 7:
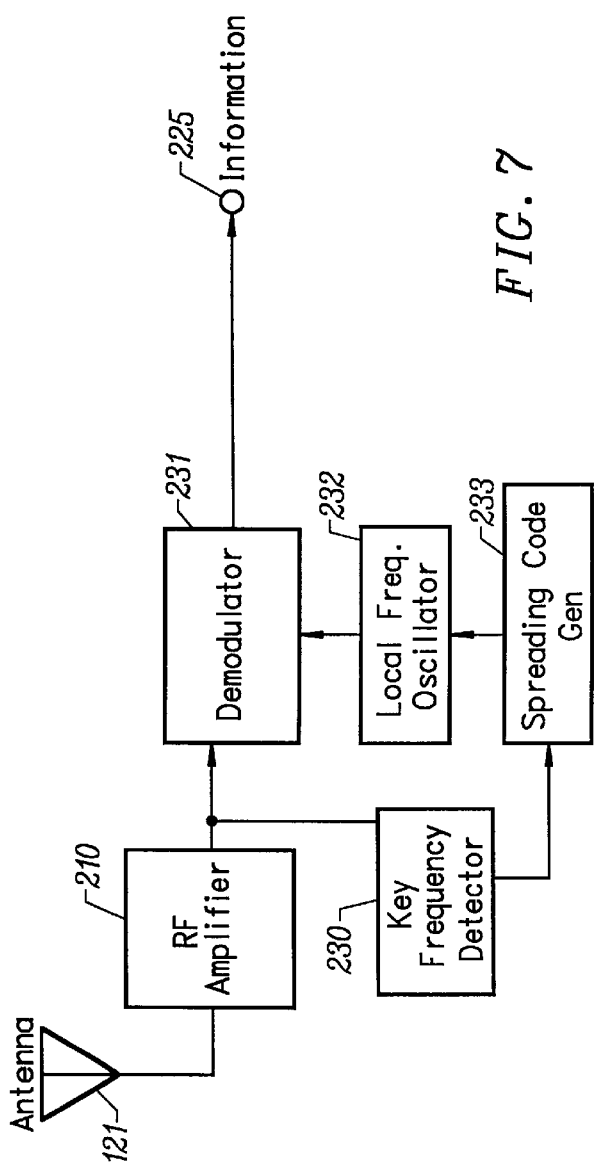
FIG. 7 is a functional block diagram of a frequency-hopping spread spectrum receiver as used in another embodiment of the invention.

FIGS. 6 and 7 are functional block diagrams of spread spectrum receivers for use with the direct sequence transmitter of FIG. 4 and the frequency-hopping transmitter of FIG. 5, respectively. In FIG. 6 the antenna array 121 applies a detected signal to RF amplifier 210 which may connected to an interfrequency stage or may directly connect to the demodulator. The IF signal is then applied to mixer 233. A synchronization module 221 receives the output from mixer 223 and the spreading code from unit 226 and correlates the two signals to provide synchronization. Synchronization 221 feeds the spreading code generator with proper information enabling the generation of the proper PN sequence. Mixer 223 receives the spreading code from unit 224 and despreads the incoming signal for demodulator 220 which provides the transmitted information at 225.

In FIG. 7 a frequency-hopping spread spectrum receiver is illustrated functionally and again includes the antenna array 121 from which detected signals are applied to RF amplifier 210. The amplified signals are applied to a demodulator 231 which is driven by a local frequency oscillator 232 under control of the spreading code generator 233. Code generator 233 responds to the detected key frequency from detector 230 in controlling the local frequency oscillator 232. The recovered information is taken at the output of demodulator 231.

Figure 8:
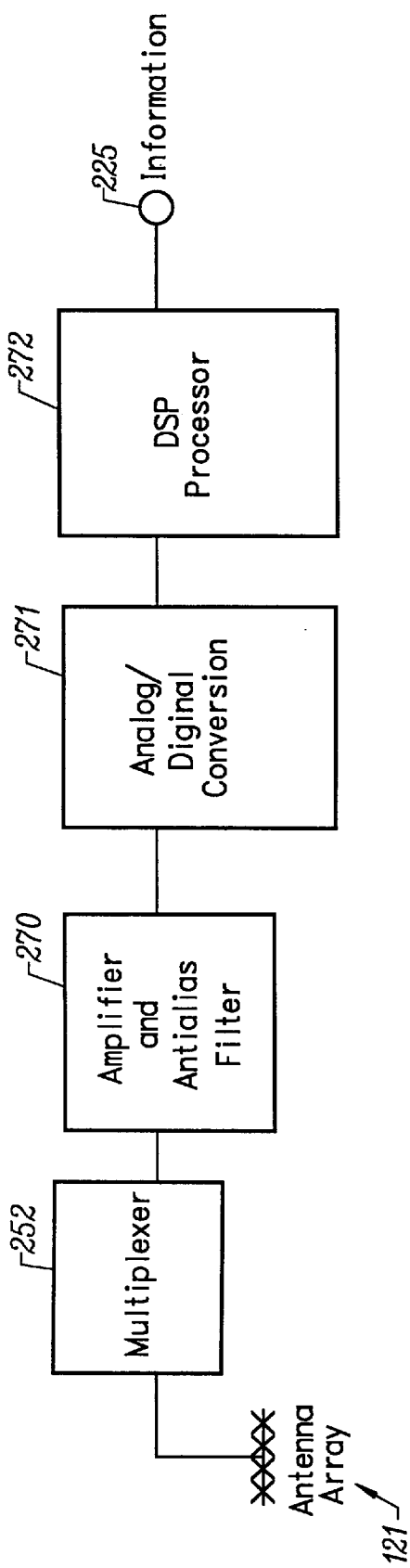
FIG. 8 is a functional block diagram of a frequency-hopping spread spectrum receiver using a digital signal processor as employed in one embodiment of the invention.

Referring to FIG. 8 the preferred method for despreading of the bandwidth or synchronizing of the transmission in the case of frequency-hopping spread spectrum is accomplished using DSP technology. Signals from antenna array 121 are multiplexed at 252, amplified at 270, and A/D converted at 271. The digital signals are then applied to DSP 272 to retrieve information. The use of filter and transformation algorithms known in the DSP art to interpret the incoming signal and its frequency components simplify the task of locating and distinguishing the individual transmitters. Each frequency component identified is stored with its signal level. The transmitter sequence is known and a match is determined by comparison with the master sequence list in a ROM of the receiver. The transmitter signal level is tracked across the total bandwidth and the information is processed by the display mapper into depth, location under the antenna array, and pipe identity.

Figure 9:
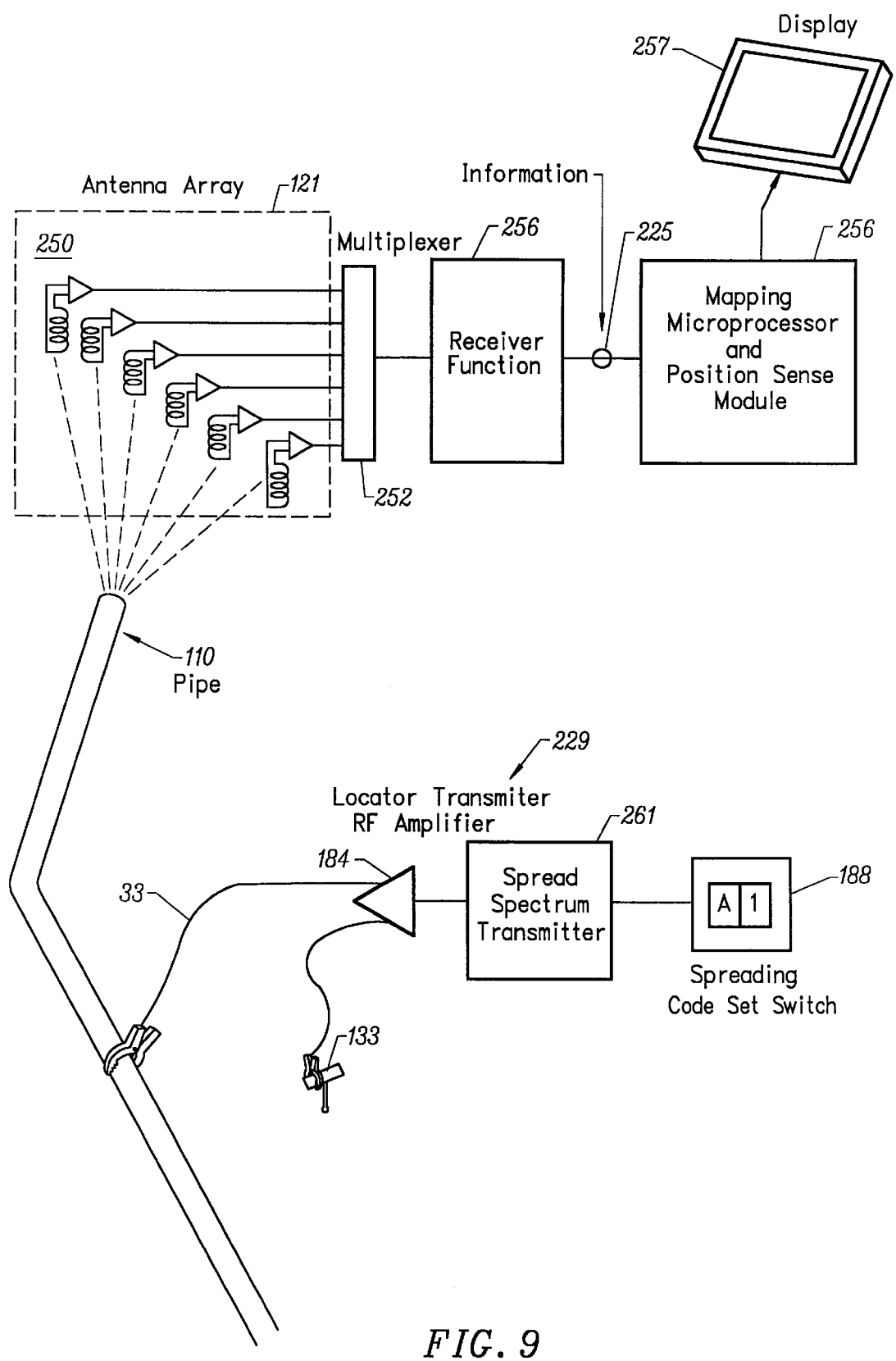
FIG. 9 is a schematic representation of a locator transmitter and locator receiver in accordance with the invention.

FIG. 9 illustrates the overall system including the locator transmitter 229, and local receiver 228. The operator uses local receiver 228 consisting of the antenna array 255, multiplexer 252, receiver function 256 (as disclosed in FIGS. 6 and 7), mapper microprocessor 256 and associated software, and display 257 which positions the pipe relative to a known starting location. The operator signals the locator receiver 228 by indicating a function on the display panel or other mechanical to electrical means for the processor 256.

This is the start of the location. The cursor on the screen of display 257 is located in the center of the viewing area and as the operator travels in any horizontal direction. The antenna array sensors 121 pick up electromagnetic signals from the pipes. The position sense module 72 (FIG. 3) provides location relative to the start position. The receiver function 256 despreads the spread spectrum signal and identifies a pipe 110 with its associated connected transmitter 229 along with the underground position of pipe 110. In a field with multiple pipes and transmitters, the receiver function 256 distinguishes and records each pipe location separately. The algorithm of display 257 converts the detected signals into colored pipe positions. If the display 257 is in map mode it indicates the position of the pipe. If the display is in a vertical mode it indicates the depth of the pipe. There can be a combination view that shows the position of the pipe and a flag on the screen that indicates depth. The display will begin to indicate the location of pipes as the operator moves forward. As the operator advances, the display makes changes in the view according to the direction of travel. The pipe will appear to be in the center of the display on crosshairs if it is directly under the center of the sensor array. The operator can mark the ground with paint or other substance for future reference. The operator continues to advance the locator receiver along the pipe, and a continuous log is made of the pipe location on the display. A color or gray scale hatched equivalent of the pipe under investigation is presented on the display. Adjacent pipes or other underground features are illuminated by other colors or different gray scale hatched equivalents. The locator receiver determines uniqueness of the pipes by the spread spectrum spreading code from the transmitter or the absence of codes in the case of other underground features or signals. A printer can be attached to obtain a permanent record of the information. The depth of the pipe under investigation can be determined by switching the display from the map view to a cross-section view (vertical mode). This gives a continuous depth of the pipe under surveillance.

The invention has been described in the above embodiments for an active mode of operation. However, the invention can be operated in a passive mode whereby spread spectrum is turned off. In the passive mode the receiver operates in one of three submodes. The submodes determine the frequency bands to which the receiver is tuned, the power submode is preferably tuned to a frequency band of 100 Hz to 190 Hz. In this submode the receiver is scanning the band for second and third harmonic leakage from power cables which have their fundamental frequency at 50 or 60 Hz. The electronic scan of this band of frequencies also may include the fundamental frequencies in order to determine phase angle consistency with the harmonics to insure like generators in the transmitter and receiver and therefore the correct cable or wire. The display can be made to show the actual frequency spectrum determined by the sensor array or a time domain representation of the magnetic field as a map. Selections can allow a view at the fundamental, second, or third harmonic of the signals on the sensor array to avoid confusion from multiple signals. These signals are passive and are not specifically transmitted.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A method of locating an underground electrically conductive object comprising the steps of:
   a) applying an electrical signal to the object at one location on the object, the electrical signal being modulated by spread spectrum using a code unique to the object,
   b) detecting radiated signals from the object,
   c) demodulating the detected signals using the code unique to the object to identify signals radiated by the object, and
   d) processing the demodulated signals to locate the object.

2. The method as defined by claim 1 wherein in step a) the electrical signal is modulated by a pseudo-noise (PN) generator and in step c) the detected signal is demodulated using a pseudo-noise generator.

3. The method as defined by claim 2 wherein step a) includes use of frequency-hopping in modulating the electrical signal.

4. The method as defined by claim 3 wherein step a) includes use of a direct digital synthesizer in frequency-hopping.

5. The method as defined by claim 3 wherein step a) includes use of phase lock loops for frequency-hopping.

6. The method as defined by claim 1 wherein step b) is carried out by a receiver above ground.

7. Apparatus for locating an underground electrically conductive object comprising:
   a) a transmitter for applying an electrical signal to the object at one location on the object, the electrical signal being modulated by spread spectrum using a code unique to the object,
   b) a detector for detecting radiated signals from the object,
   c) a demodulator for demodulating the detected signals using the code unique to the object to identify signals radiated by the object, and
   d) a processor for processing the demodulated signals to locate the object.

8. Apparatus as defined by claim 7 wherein the transmitter modulates the electrical signal in a discrete number of frequency bands, and the detector detects harmonics of fundamental frequency signals.

9. Apparatus as defined by claim 7 wherein the transmitter modulates the electrical signal by a generated pseudo-noise, and the demodulator demodulates the detected signals using the pseudo-noise.

10. Apparatus as defined by claim 9 wherein the transmitter includes a doubly balanced mixer to suppress an RF carrier signal.

11. Apparatus as defined by claim 9 wherein the transmitter uses frequency-hopping in modulating the electrical signal.

12. Apparatus as defined by claim 11 wherein the transmitter includes a direct digital synthesizer for use in frequency-hopping.

13. Apparatus as defined by claim 11 wherein the transmitter includes phase lock loops for frequency-hopping.

14. Apparatus as defined by claim 9 wherein the transmitter uses direct sequence spread spectrum.

15. Apparatus as defined by claim 14 wherein the transmitter includes a direct digital synthesizer.

16. Apparatus as defined by claim 7 wherein the detector is above ground.

* * * * *